United States Patent [19]

Kellner et al.

[11] Patent Number: 5,987,410

[45] Date of Patent: Nov. 16, 1999

[54] METHOD AND DEVICE FOR RECOGNIZING SPEECH IN A SPELLING MODE INCLUDING WORD QUALIFIERS

[75] Inventors: Andreas Kellner, Aachen, Germany; Frank Seide, Taipeh, Taiwan

[73] Assignee: U.S. Philips Corporation, New York, N.Y.

[21] Appl. No.: 08/966,722

[22] Filed: Nov. 10, 1997

[51] Int. Cl.[6] .................................................... G10L 7/08
[52] U.S. Cl. ............................................ 704/255; 704/256
[58] Field of Search ................................... 704/235, 231, 704/256, 270, 240, 255

[56] References Cited

U.S. PATENT DOCUMENTS 5,208,897  5/1993  Hutchins .................................. 704/200
5,638,425  6/1997  Meadow, III et al. .................. 704/270

*Primary Examiner*—Richemond Dorvil

[57] ABSTRACT

A method and device for recognizing speech that has a sequence of words each including one or more letters. The word and letters form a recognition data base. The method receives and recognizes the speech by preliminary modelling among various probably recognized sequences. The method selects one or more model sequences as result. In particular, the method allows in a model sequence of exclusively letters, various words as a subset. Such words are used to qualify one or more neighbouring or included letters in the sequence. An applicable model is a mixed information unit model.

6 Claims, 2 Drawing Sheets

METHOD AND DEVICE FOR RECOGNIZING SPEECH IN A SPELLING MODE INCLUDING WORD QUALIFIERS

BACKGROUND OF THE INVENTION

The present invention relates to a method of speech recognition. Speech recognition is used in many environments, such as speech-to-text conversion and ordering and enquiry systems. In such systems it is often necessary to match speech items versus a large data base that may contain such diverse items as personal or other names. However, the search for a particular name in such data base may lead to acoustically ambivalent results or become computationally unfeasible. Now, in person-to-person dialogs, spelling of a name or other difficult word, such as a scientific or foreign term is common procedure. Usually, a person will execute such spelling on a letter-by-letter basis, either phonetically, or through using so-called standard alphabets. However, various persons may spell in a manner that has still further variations which makes consistency fully illusory. It has been recognized by the invention that for better adapting to a particular user, a machine should be able to cope with exceptions to the letter-only sequence, in particular when interspersed qualifiers in the form of full words or even descriptive phrases are used from a limited subset of the data base. In practice, these qualifiers would render the spelling more powerful.

SUMMARY TO THE INVENTION

In consequence, amongst other things, an object of the present invention allows the use of such qualifiers in a sequence that for the remainder would generally consist of only letters, each qualifier may pertain to one or more letters. A single letter may even have more than a single qualifier. Now therefore, according to one of its aspects the invention the wording of the qualifying itself follows particular syntactic procedures, for example, it may pertain to one or more preceding or succeeding neighbour letters, that need not be even contiguous to the qualifier. It has been found that the enlarging of the applicable database is relatively modest, as compared to the improved system robustness. It is not even necessary to explicitly change-over from a word string recognition mode to a letter string recognition graph mode. In certain circumstances, the system may do such changing self-reliantly, as the necessity would occur. Further, the two modes of recognition correspond to a high degree, but only the objects to be taken for comparison are different. According to the invention, first the speech is converted to letter sequences; subsequent operations need not to be aware of the procedure for ascertaining the spelling.

The invention also relates to a device arranged for executing a method as described.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
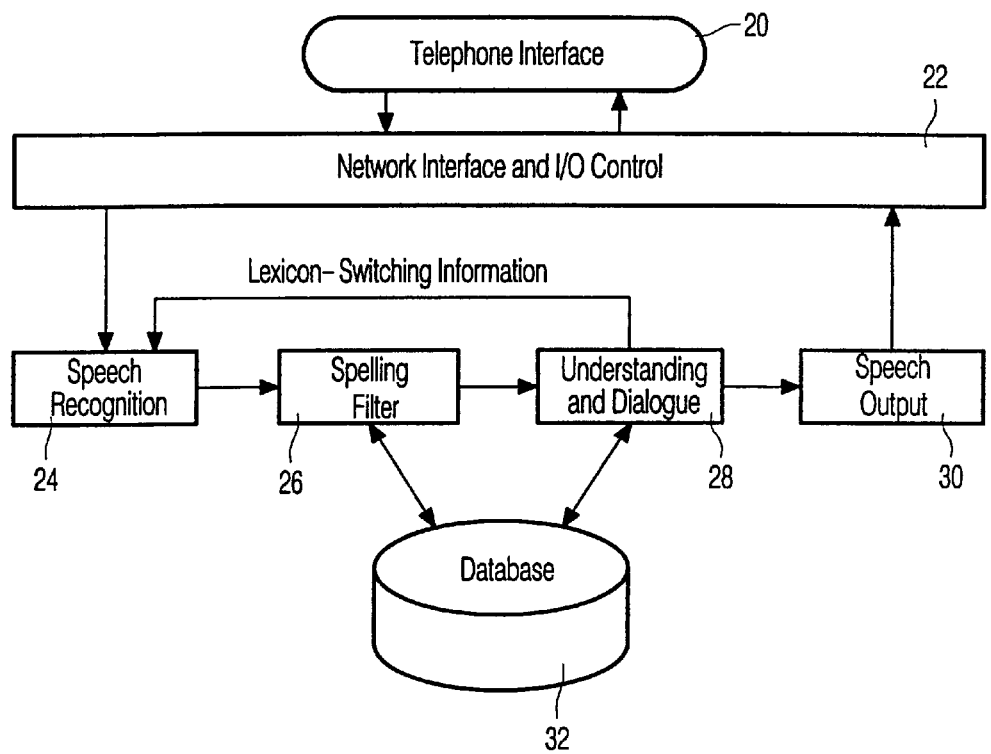
FIG. 1, an exemplary system architecture.

FIG. 1 shows an exemplary system architecture that interfaces (20) to a telephone system not shown. The system comprises network interface and I/O control unit 22, speech recognizer 24, a special spelling filter or postprocessor 26, speech understanding and dialog control component 28, speech output unit 30, and data base 32. The system of FIG. 1 recognizes speech units included in the database 32. The speech recognition unit 24 processes the speech units as received and performs preliminary recognition thereof. Further, the spelling filter 26 generates a number of possible recognized sequences to select one or more of these sequences. The invention is mainly centered in the spelling filter, that further outputs one or more sequences of exclusively words with associated probability scores. Subsequent to spelling filter 26, the recognizing of single words is finished. As the interface between speech recognition, spelling, and speech understanding, word graphs are used. A word graph is a compact representation of various plausible sentence or sequence hypotheses. Every individual path through the graph is a hypothesis.

At every dialog turn, the speech recognizer processes the caller's utterance and produces a word graph. In the spelling mode, a graph is used that consists of letters and qualifiers. The spelling mode may be controlled either by the system or by the user person, but this has not been further detailed for brevity. Otherwise, the recognizer is configured to recognize single-word utterances only, so a word graph then represents one or more candidate strings built from single words. To achieve a better recognition score and real-time operation, the recognizer's vocabulary may switched-over to enable only those words expected in the actual dialog state.

The spelling filter scans the recognizer output for letter sequences inclusive of qualifiers such as spelling terms and descriptive phrases, that form valid names which figure in a name list or another set of "difficult" candidate words. These "names" are then joined as word hypotheses to the word graph. Thus, the subsequent speech understanding engine smoothly integrates with the spelling.

Figure 2:
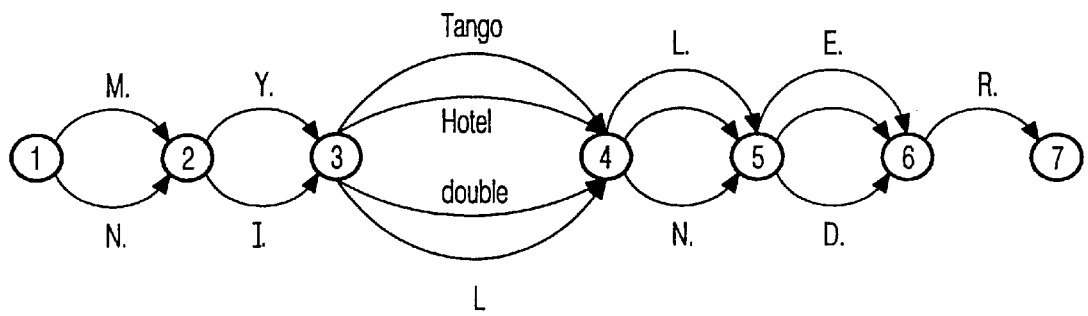
FIG. 2, a letter-based graph for the word "Miller"

FIG. 2 shows such a sample word-graph for the word "Miller", here consisting of the sequence "M, I, double L, E, R". At its output, the spelling filter presents all spelled words as word hypotheses, inclusive of possible misrecognitions. Now spelling is usually performed letter-by-letter, either in the form of a conventional phonetic representation of this letter, such as in English a(ye), bee, cee, and the like, or as an element of a set of standard words (so-called standard alphabet) that begin with the intended letter, such as alpha, bravo, charlie, . . . tango . . . etc. Various different such standard alphabets may be used side-by-side. However, users alternatively may want to qualify a certain letter or letters by inserting one of a set of qualifiers, that may be single words or descriptive phrases. A first case is to use a phrase like "double T", "M as in Mike", "capital B", "Meyer with ee why" (as opposed to Myer or Meier), or "René with one ee accent" (as opposed to Renee or Renée). A second case is when a diacritical sign is called, such as an "apostrophe", or "connecting stroke", for which sign no phoneme is conventionally available. A third case is when a letter-modifying sign is called, such as a (French) accent, (German) umlaut, or (Spanish) tilde. A fourth case is when a whole word outside the standard spelling alphabet(s) is called as part of a sentence that has the intended letter on a prominent position, often the first, although even the latter restriction is not mandatory. For digits, also various different representations may be used, such as twelve versus one-two, fifty-nine versus five-nine, and so on.

The word graph of FIG. 2 shows the seven states 1–7, that generally are interconnected by the representation of a letter, or in this case by the representation by a word from a standard spelling alphabet such as Tango for T. However, a further entry into the graph is the qualifying word double. In certain cases, the qualifying may lead to a longer string of model states, such as "two times", or another of the examples discussed supra.

Figure 3:
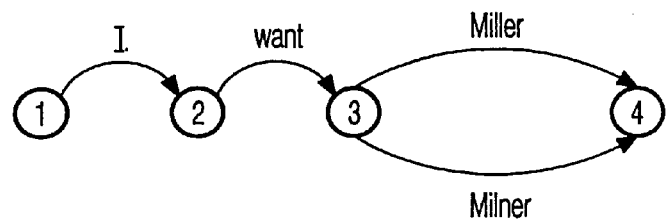
FIG. 3, a mixed graph based on both words and letters.

FIG. 3 shows a mixed graph based on both words and letters. Here, the two transitions from state 1 to state 3 each represent a single unitary (non-spelled) word. However, the transition from state 3 to state 4 represents a "name" that is spelled and mapped on a graph according to the principles discussed with reference to FIG. 2.

Figure 4:
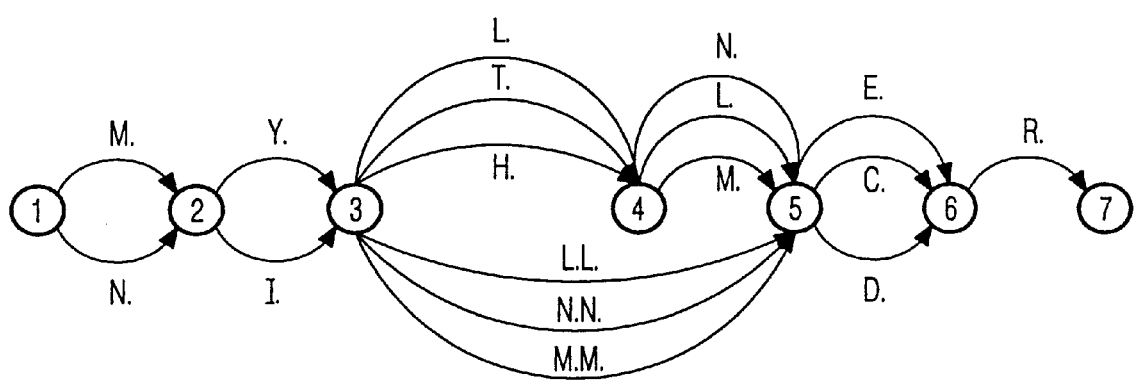
FIG. 4, a sample search graph.

The result of the parse is stored in the search graph shown in FIG. 4. It has the same nodes as the underlying word graph; its arcs are the letters or letter sequences that were produced both from the letters and from the qualifying expressions. The paths between the left hand and right hand ends of the graph may or may not have the same lengths. If this is not the case, the various lengths are treated on their own merits. The search graph can now be matched against the knowledge source, that in a very large directory may contain several 100,000 names or other items. The graph is then searched for letter sequences that here constitute valid names, and for every valid word so found, a word arc is added to the graph in question. Depending on the actual list, probable valid names could for this case be Miller, Midler, and Milner. For every word arc so found, the acoustical likelihood of the underlying letter sequence is now enumerated versus the language probability model found in the stochastic spelling grammar. In theory, the fact may be considered that certain names have a higher probability to occur. So, three aspects may play a part in the recognition:

the acoustical likelihood of the letters taken separately;

the grammar of the qualifier-and-letter transcription;

the theoretical likelihood of certain names versus others.

according to the present invention, method for recognizing speech can be configured as a step in a dialog procedure. Further, this step in the dialog procedure recognizes a single word.

We claim:

1. A device for recognizing speech units included in a recognition data base, the speech units being a sequence of words having one or more letters, comprisinq:

a speech recognizer for processing the speech units as received and performing preliminary recognition of the speech units;

a spelling filter for generating a number of possible recognized sequences of the speech units, selecting one or more of the possible recognized sequences as a potential recognition result and joining an associated probability score to each of the possible recognized sequences selected;

wherein each of the number of possible recognized sequences of the speech units include a sequence of letters and a subset of one or more of the words in the data base, the subset of the words being a qualifier for one or more the sequence of letters.

2. A method for recognizing speech units included in a recognition data base, the speech units being a sequence of words having one or more letters, said method comprising the steps of:

processing the speech units as received;

performing preliminary recognition of the speech units;

generating a number of possible recognized sequences of the speech units; and selecting one or more of the possible recognized sequences as a potential recognition result and joining with an associated probability score;

wherein each of the number of possible recognized sequences of the speech units include a sequence of letters and a subset of one or more of the words in the data base, the subset of the words being a qualifier for one or more the sequence of letters.

3. The method as claimed in claim 2, wherein the qualifier implies supplementing any of a diacritical sign, a letter-modifying sign, a doubling indication, or a reference to a whole containing the second level information unit or units in question.

4. The method as claimed in claim 2, being arranged as method for recognizing a word comprising the letters used for a mixed level model.

5. The method as claimed in claim 2, which is configured as a step in a dialog procedure.

6. The method as claimed in claim 5, wherein the step in the dialogue procedure recognizes a single word.

* * * * *